US010601467B1

(12) United States Patent
Gommé et al.

(10) Patent No.: US 10,601,467 B1
(45) Date of Patent: Mar. 24, 2020

(54) NEAR-FIELD WIRELESS DEVICE

(71) Applicant: NXP B.V., Eindhoven (NL)

(72) Inventors: Liesbeth Gommé, Anderlecht (BE); Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/439,884

(22) Filed: Jun. 13, 2019

(51) Int. Cl.
| H04B 5/00 | (2006.01) |
| H04W 12/06 | (2009.01) |
| H04W 4/80 | (2018.01) |
| H04B 17/318 | (2015.01) |

(52) U.S. Cl.
CPC ......... H04B 5/0012 (2013.01); H04B 17/318 (2015.01); H04W 4/80 (2018.02); H04W 12/06 (2013.01)

(58) Field of Classification Search
USPC ........................................................ 455/41.1
See application file for complete search history.

(56) References Cited

U.S. PATENT DOCUMENTS

| 9,811,164 | B2 | 11/2017 | Poupyrev | |
| 9,949,013 | B2 | 4/2018 | Hviid et al. | |
| 10,112,556 | B2 * | 10/2018 | Buttolo | B60R 16/005 |
| 10,277,284 | B1 * | 4/2019 | Kerselaers | H04B 5/0043 |
| 10,491,270 | B1 * | 11/2019 | Kerselaers | H04B 5/0012 |
| 10,492,002 | B1 * | 11/2019 | Thoen | H04R 5/033 |
| 10,498,397 | B1 * | 12/2019 | Nackaerts | H04B 5/0025 |

| 2013/0072115 | A1 * | 3/2013 | Dobyns | H04B 5/0081 455/41.1 |
| 2016/0104334 | A1 * | 4/2016 | Handville | G07C 9/00571 340/5.61 |
| 2017/0062949 | A1 * | 3/2017 | Kerselaers | H04B 5/0031 |
| 2017/0075654 | A1 * | 3/2017 | Shin | G06F 3/167 |
| 2017/0083115 | A1 * | 3/2017 | Speck | G06F 3/011 |
| 2017/0083494 | A1 * | 3/2017 | Kim | G06F 3/167 |
| 2017/0236346 | A1 * | 8/2017 | Murar | G07C 9/00309 340/5.61 |
| 2017/0236350 | A1 * | 8/2017 | Lin | G07O 9/00309 340/5.61 |
| 2017/0316192 | A1 * | 11/2017 | Razouane | A61B 5/1172 |
| 2017/0324170 | A1 * | 11/2017 | Kerselaers | H01Q 1/273 |

(Continued)

OTHER PUBLICATIONS

U.S. Appl. No. 16/200,456; not yet published; 31 pages filed Nov. 26, 2018.

*Primary Examiner* — Edward F Urban
*Assistant Examiner* — Max Mathew

(57) ABSTRACT

One example discloses a wireless device, including: a first near-field device, including a near-field receiver, configured to be coupled to a first surface; wherein the first near-field device is configured to receive a received near-field signal having a received signal strength (RSS); wherein the received near-field signal originates from a second near-field device having a near-field transmitter and configured to be coupled to a second surface; wherein the second near-field device is configured to generate a transmitted near-field signal having a transmitted signal strength (TSS); wherein the TSS of the transmitted near-field signal interacts with a third surface to transform into the RSS of the received near-field signal; and wherein the first near-field device is configured to translate a magnitude of the RSS to a distance of the first and/or second surfaces from the third surface.

19 Claims, 7 Drawing Sheets

(56) References Cited

U.S. PATENT DOCUMENTS

2018/0158551 A1* 6/2018 Bradley ............. G06K 9/00892
2019/0086066 A1* 3/2019 Boesen ................ F21V 23/045
2019/0366178 A1* 12/2019 Merrill ................ A63B 67/002
2019/0373411 A1* 12/2019 Dobyns ................ H04W 4/023

* cited by examiner

NEAR-FIELD WIRELESS DEVICE

The present specification relates to systems, methods, apparatuses, devices, articles of manufacture and instructions for near-field wireless devices.

SUMMARY

According to an example embodiment, a wireless device, comprising: a first near-field device, including a near-field receiver, configured to be coupled to a first surface; wherein the first near-field device is configured to receive a received near-field signal having a received signal strength (RSS); wherein the received near-field signal originates from a second near-field device having a near-field transmitter and configured to be coupled to a second surface; wherein the second near-field device is configured to generate a transmitted near-field signal having a transmitted signal strength (TSS); wherein the TSS of the transmitted near-field signal interacts with a third surface to transform into the RSS of the received near-field signal; and wherein the first near-field device is configured to translate a magnitude of the RSS to a distance of the first and/or second surfaces from the third surface.

In another example embodiment, the RSS signal is a non-propagating quasi-static electric near-field signal; and the third surface includes a conductive surface configured to conduct the non-propagating quasi-static electric near-field signal.

In another example embodiment, the RSS signal is a non-propagating quasi-static magnetic near-field signal; and the third surface includes a coil configured to conduct the non-propagating quasi-static magnetic near-field signal.

In another example embodiment, the RSS signal magnitude decreases when the distance between the first or second surfaces and the third surface decreases.

In another example embodiment, the RSS signal magnitude increases when the distance between the first or second surfaces and the third surface increases.

In another example embodiment, the first and second surface are two different locations on a single surface.

In another example embodiment, the single surface is a user's body.

In another example embodiment, the first surface is proximate to the user's hand and/or finger; and the second surface is proximate to the user's torso.

In another example embodiment, the third surface includes surface variations; and variations of the RSS signal magnitude when the first or second surfaces is proximate to and/or touches the third surface at a set of locations correspond to the surface variations of the third surface.

In another example embodiment, a coded pattern of surface variations is added to the third surface.

In another example embodiment, the RSS signal magnitude includes the coded pattern in response to the first or second surfaces proximity to and/or touching of the third surface at each of the set of locations.

In another example embodiment, the RSS signal magnitude includes the coded pattern in response to the first or second surfaces swiping across the third surface over the set of locations.

In another example embodiment, the first near-field device includes a controller; the controller is configured to record a set of distances within a time period; and the controller is configured to output an authentication signal if the set of distances corresponds to a stored set of distances.

In another example embodiment, the authentication signal at least one of: activates an electronic device, permits entry to a secure space, indicates that a procedure has been correctly followed, and/or indicates that a quality assurance procedure has been performed.

In another example embodiment, the first near-field device includes a controller; and the controller is configured to monitor the distance.

In another example embodiment, the controller is configured to output an boundary breached signal if the distance is less than a predetermined distance.

In another example embodiment, the controller is configured to generate an acoustic signal having an amplitude and/or frequency modulated by the distance.

In another example embodiment, the controller is configured to generate a visual cue modulated by the distance.

In another example embodiment, the received near-field signal is a first received near-field signal; the RSS is a first RSS; the transmitted near-field signal is a first transmitted near-field signal; the TSS is a first TSS; the first near-field device includes a near-field transmitter; the first near-field device is configured to generate a second transmitted near-field signal having a second TSS; the second near-field device includes a near-field receiver; the second near-field device is configured to receive a second received near-field signal having a second RSS; the second TSS of the second transmitted near-field signal interacts with the third surface to transform into the second RSS of the second received near-field signal; the second near-field device is configured to transmit the second received near-field signal to the first near-field device; and the first near-field device is configured to generate an error signal if the second RSS and the first RSS differ by more than a predetermined RSS magnitude over a predetermined time period.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
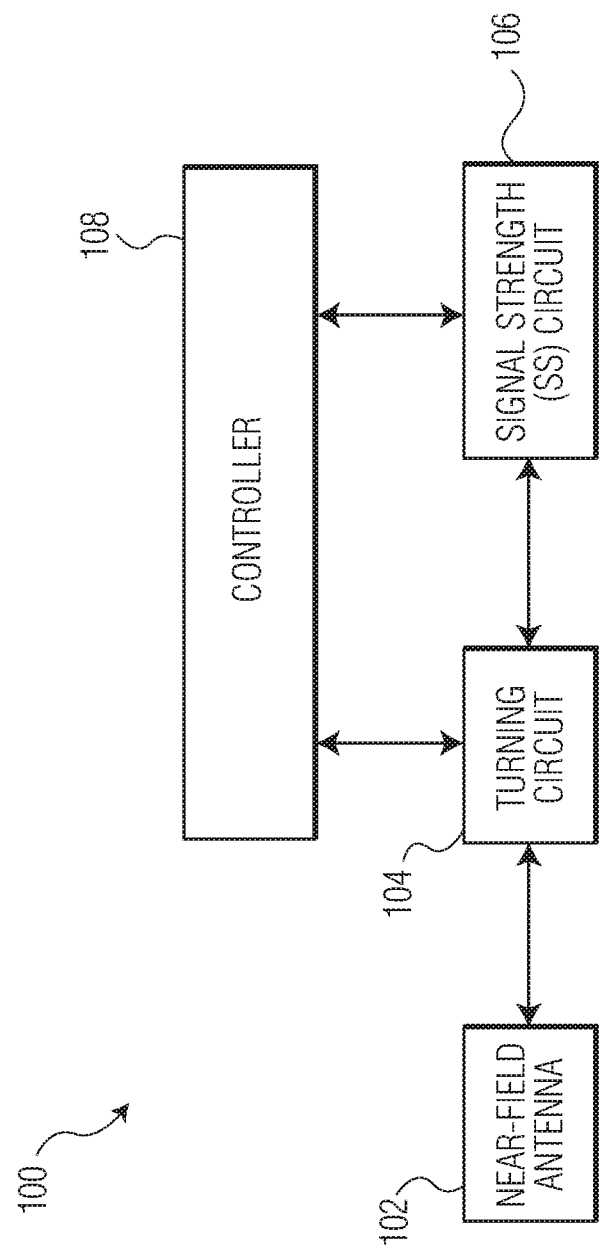
FIG. 1 is an example of a near-field wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are on body communication and communications with other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive structure (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

In various operational settings a distance of such wireless and/or wearable devices with respect to an environment can be useful.

Now discussed are example near-field wireless devices that measure a change in Received Signal Strength (RSS) when a near-field wireless device is sufficiently close to a conductive medium (e.g. a conductive surface). Discussed below are near-field wireless devices that makes use of the near-field coupling mechanisms (electrical and magnetic) to various surfaces, some of which are conductive, using the near-field signal's RSS.

Changes in the RSS are mapped to various movements of the near-field wireless devices with respect to each other, some of which may be worn by a user who's movements need to be carefully tracked as the user approaches and moves away from various other surfaces in an environment (see below for example applications of this technique).

FIG. 1 is an example of a near-field wireless device 100. The example near-field wireless device 100 includes a near-field antenna 102, a transceiver/tuning circuit 104, a signal strength (SS) circuit 106, and a controller 108. Examples of the near-field antenna 102 are presented and discussed in FIGS. 2A and 2B. The transceiver/tuning circuit 104 is configured to adjust the device's 100 resonance frequency and bandwidth. The signal strength (SS) circuit 106 is configured to set a transmitted signal strength (TSS) and monitor a received signal strength (RSS) of near-field communications signals transmitted and received by the wireless device 100.

The controller 108 is configured to adjust the transceiver/tuning circuit 104 parameters, set the TSS and receive the RSS. The controller 108 also determines a distance of the wireless device 100 from other surfaces and maps the TSS and/or RSS to predetermined sets of signal strength values that correspond to distances, surfaces and/or movements of either the wireless device 100 or a user coupled to the wireless device 100.

Operation of the near-field wireless device 100 is further discussed in FIGS. 3-7 below.

Figure 2B:
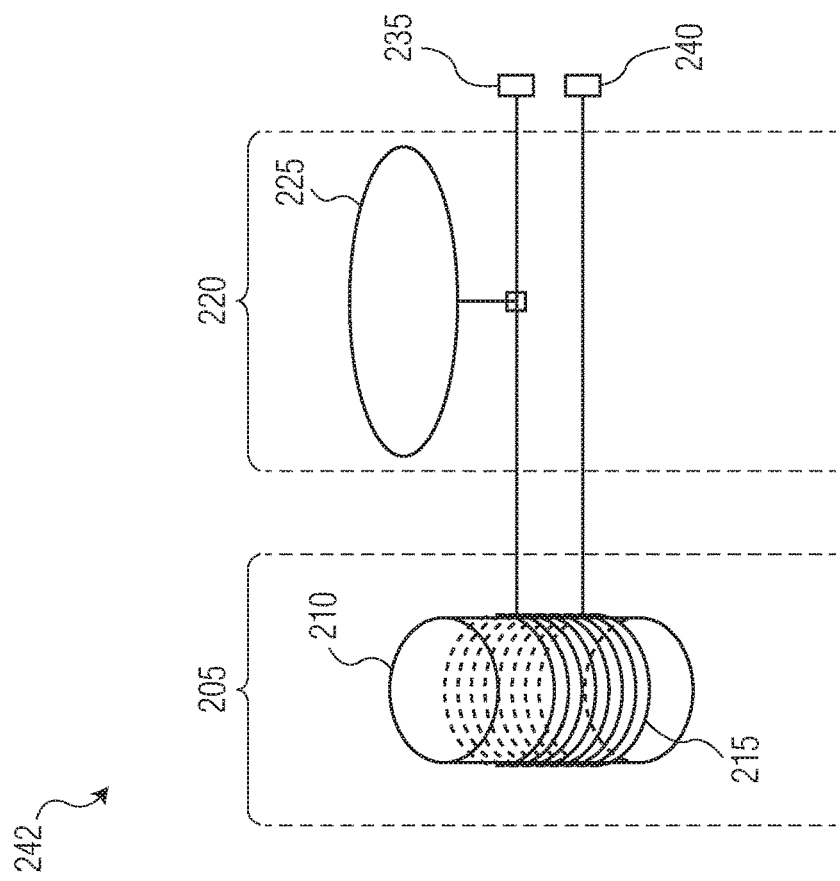
FIG. 2B is a second example of the near-field antenna in the wireless device.
Figure 2A:
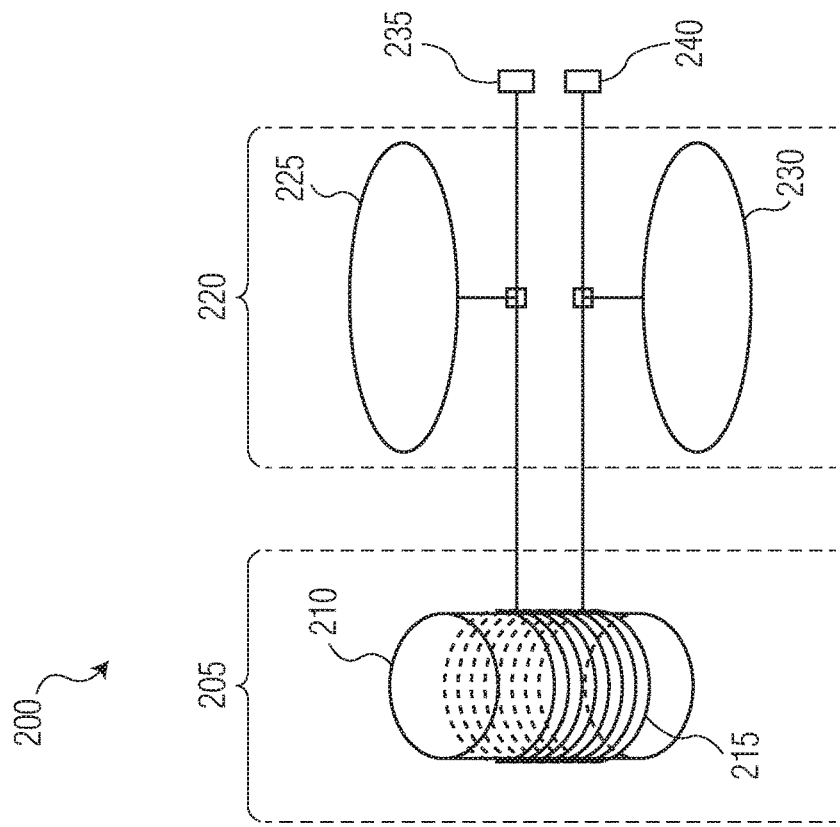
FIG. 2A is a first example of a near-field antenna in the wireless device.

FIG. 2A is a first example of a near-field antenna 200 in the wireless device 100. In this example the antenna 200 is a near-field electromagnetic induction (NFEMI) antenna. In some example embodiments, the antenna 200 includes a coil (H-field) antenna 205 for magnetic fields, in conjunction with a short loaded dipole (E-field) antenna 220 for electric fields. The H-field antenna 205 includes a ferrite core 210 wound with wire 215. The E-field antenna 220 includes two conductive loading structures 225 and 230. Antenna 200 feed points 235, 240 are coupled to various transceiver circuitry, such as a downstream radio transmitter and receiver integrated circuit (RF-IC), (not shown here). The antenna 200 can be tuned to resonate at a communication frequency by means of reactance components that are integrated in the RF-IC. The antenna's 200 bandwidth can similarly be tuned using the reactance components.

When the NFEMI antenna 200 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 200 operates at or below 50 MHz (e.g. for example at 30 MHz) to ensure that the fields are following the structure's contours and to ensure that far field radiation is strongly reduced.

In some example embodiments, one of the conductive surfaces 225, 230 faces a user's skin and the other is oriented towards the environment yielding a capacitance between this plate and the environment that changes by the proximity of the conductive surfaces 225, 230 to various objects in the environment. This proximity will be visible in a recorded RSS signal. In some example embodiments, the near field electric and magnetic coupling is at or below 50 MHz is used to allow gesture sensing.

FIG. 2B is a second example of a near-field antenna 242 in the wireless device 100. In this example the antenna 242 is also a near-field electromagnetic induction (NFEMI) antenna. In some example embodiments, the antenna 242 includes a coil (H-field) antenna 205 for magnetic fields, in conjunction with a short loaded monopole (E-field) antenna 220 for electric fields. The H-field antenna 205 includes a ferrite core 210 wound with wire 215. The E-field antenna 220 includes one conductive loading structure 225. Antenna 242 feed points 235, 240 are also coupled to various transceiver circuitry, such as a downstream radio transmitter and receiver integrated circuit (RF-IC), (not shown here).

Figure 3:
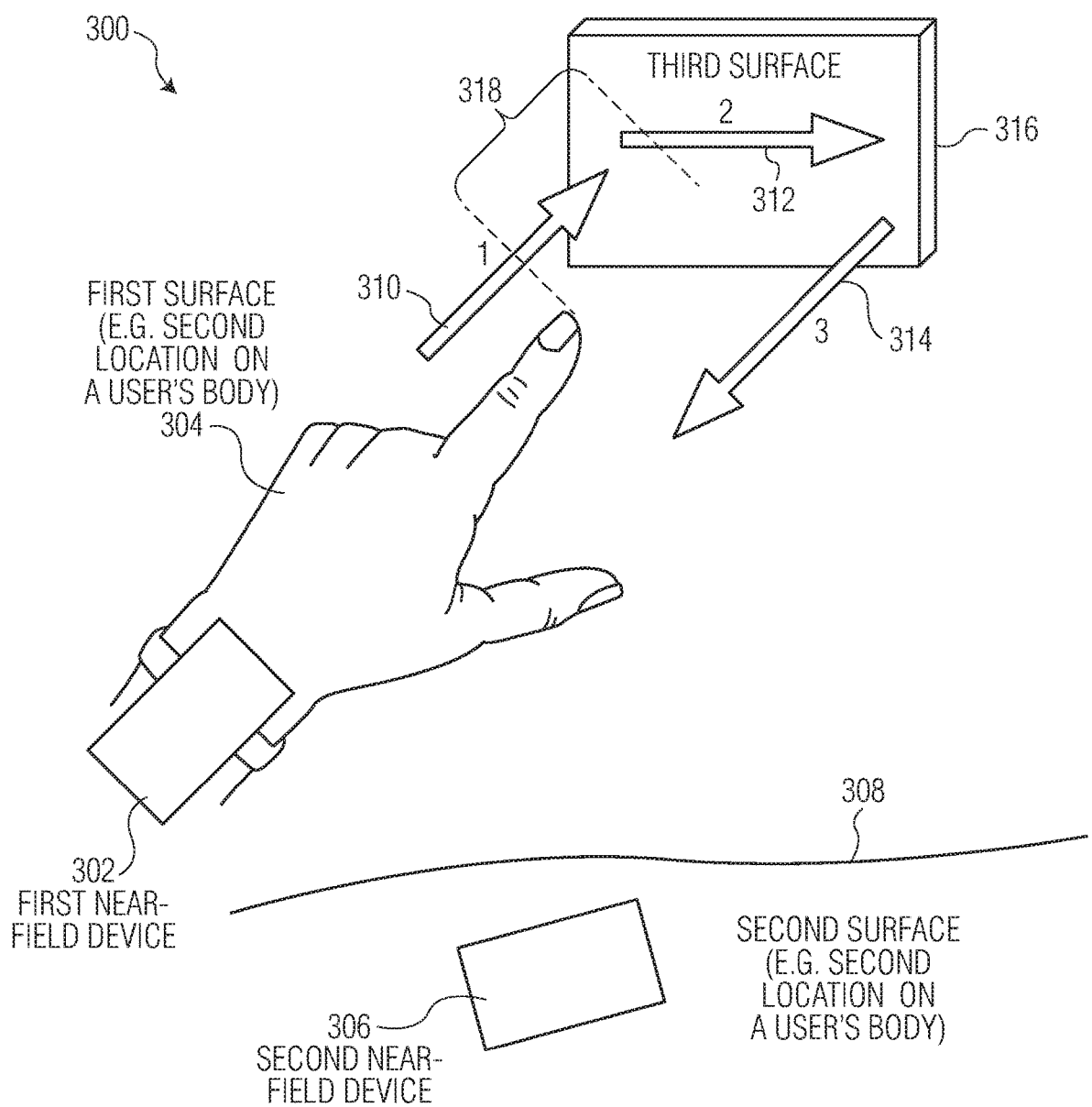
FIG. 3 is a first example of a first near-field device on a first surface and a second near-field device on a second surface moving with respect to a third surface.

FIG. 3 is a first example 300 of a first near-field device 302 on a first surface 304 (e.g. a particular user's hand-finger configuration) and a second near-field device 306 on a second surface 308 moving with respect to a third surface 316. In the example 300 movements are shown as an approaching (phase 1) 310 out of plane to the third surface 316, a swiping (phase 2) 312 substantially parallel to the third surface 316 plane, and a retreating (phase 3) 314 also out of plane to the third surface 316. At any moment in time a distance 318 of the first surface 304 (e.g. a user's finger) to the third surface 316 is shown.

In various example embodiments the first and second surface 304, 308 are two different locations on a single surface. The single surface can be a user's body, and the first surface 304 is proximate to the user's hand and/or finger; while the second surface 308 is proximate to the user's torso.

Thus for example, the first near-field device 302 can be an NFEMI device attached to a user's left wrist (e.g. perhaps in a smartwatch) and the second near-field device 306 can also be an NFEMI device but is instead attached to another position on the user's body that is not too close to the first NFEMI device.

Figure 4:
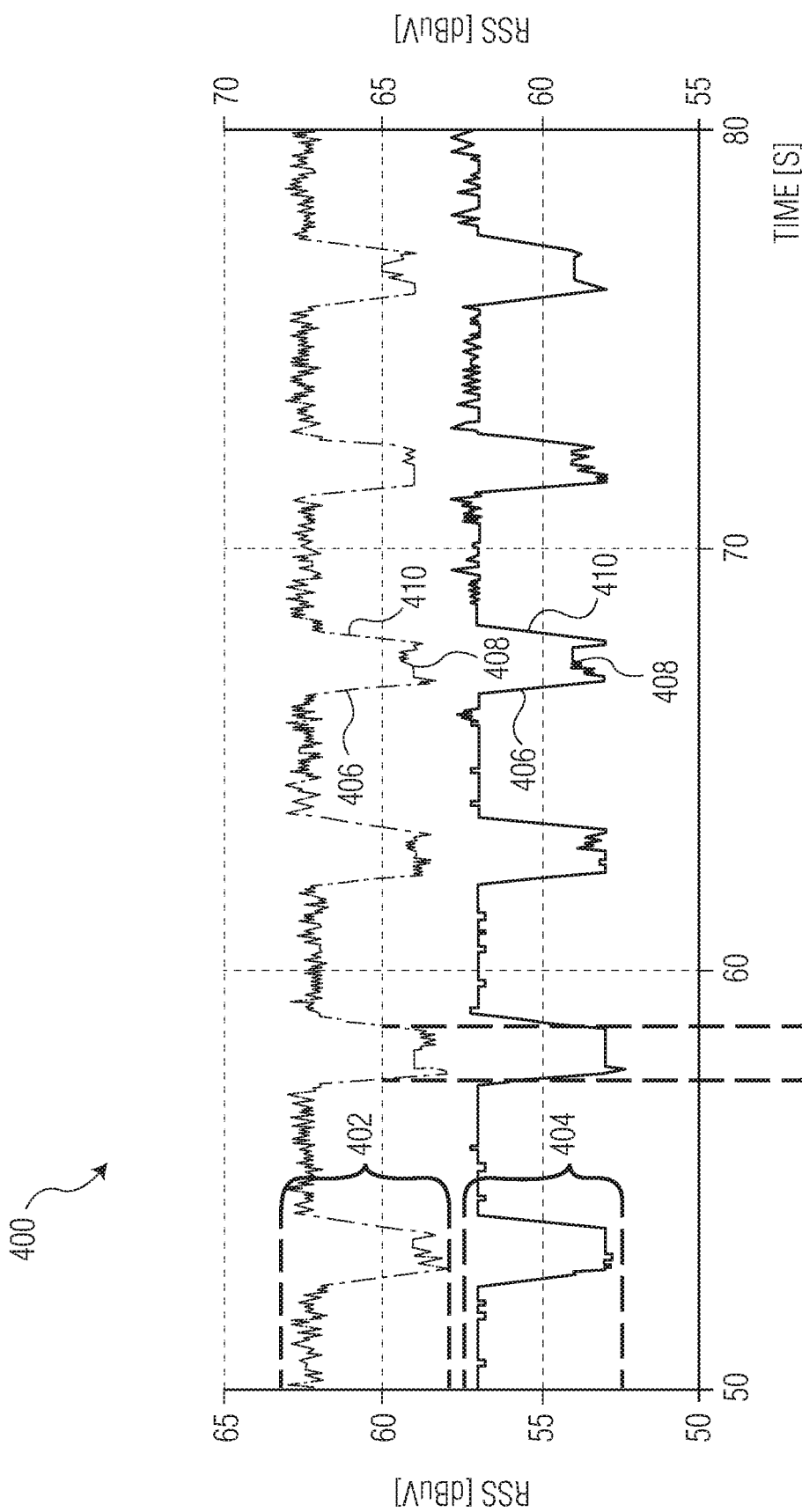
FIG. 4 is an example first set of received signal strength (RSS) signals and a second set of received signal strength (RSS) signals for the first example of FIG. 3.

In this example 300 a user's left hand is approaching a conductive surface (e.g. the third surface 316), then swiping very close to the conductive surface from left to right before finally moving away from the conductive surface. This sequence of movements is repeated for 6 times, an example of which is shown in FIG. 4. In some example embodiments, the second near-field device 306 is kept relatively motionless such that the RSS signal is affected only by the distance 318 of the first surface 304 from the third surface 316.

The first near-field device 302 is configured to receive a received near-field signal having a received signal strength (RSS). The received near-field signal originates from the second near-field device 306 having a near-field transmitter and coupled to the second surface 308. The second near-field device 306 is configured to generate a transmitted near-field signal having a transmitted signal strength (TSS). The TSS of the transmitted near-field signal interacts with the third surface 316 to transform into the RSS of the received near-field signal.

In some example embodiments, one of the conductive surfaces 225, 230 of FIGS. 2A and 2B faces a user's skin and the other is oriented towards the environment yielding a capacitance between this plate and the environment. Such a capacitance changes by the proximity of the conductive surfaces 225, 230 to various objects in the environment such as the third surface 316. So the near-fields transmitted or received by the short-loaded dipole 220 in FIG. 2A or short-loaded monopole 220 in FIG. 2B will also be impacted by such proximate third surface 316, which will be measurable in the recorded received signal strength (RSS).

In some example embodiments the RSS signal is a non-propagating quasi-static electric near-field signal, and the third surface 316 includes a conductive surface (e.g. perhaps like 225, 230) configured to conduct the non-propagating quasi-static electric near-field signal.

In other example embodiments the RSS signal is a non-propagating quasi-static magnetic near-field signal, and the third surface 316 includes a coil configured to conduct the non-propagating quasi-static magnetic near-field signal.

The first near-field device 302 translates a magnitude of the RSS to the distance 318 of the first and/or second surfaces 304, 308 from the third surface 316. The RSS signal magnitude decreases when the distance 318 between the first or second surfaces 304, 308 and the third surface 316 decreases. The RSS signal magnitude increases when the distance 318 between the first or second surfaces 304, 308 and the third surface 316 increases.

In some example embodiments the third surface 316 includes surface variations that cause variations of the RSS signal magnitude when the first or second surfaces 304, 308 comes close to or touches the third surface 316 at a set of locations correspond to the surface variations of the third surface 316. In some examples, a coded pattern of surface variations is added to the third surface 316, and the RSS signal magnitude includes the coded pattern in response to the first or second surfaces 304, 308 comes close to or touches the third surface 316 at each of the set of locations. Alternatively, the RSS signal magnitude includes the coded pattern in response to the first or second surfaces 304, 308 swiping across the third surface 316 over the set of locations.

In example embodiments of the first near-field device 302 that include a controller, the controller can be configured to record a set of distances within a time period, and output an authentication signal if the set of distances corresponds to a stored set of distances. In various example embodiments the authentication signal can: activate an electronic device, permit entry to a secure space, indicate that a procedure has been correctly followed, indicate that a quality assurance procedure has been performed, etc.

The controller can also be configured to output a boundary breached signal if the distance 318 is less than a predetermined distance 318. The boundary breached signal can cause an acoustic signal to be generated that has an amplitude and/or frequency modulated by the distance 318. The controller can also be configured to generate a visual cue modulated by the distance 318.

FIG. 4 is an example 400 first set of received signal strength (RSS) signals 402 and a second set of received signal strength (RSS) signals 404 for the first example 300 of FIG. 3. In this example 400 an approaching (phase 1) 406, a swiping (phase 2) 408, and a retreating (phase 3) 410 are shown in the RSS signal 402, 404 waveforms. A subset 412 (i.e. of one of the swipes (phase 2) 408) is labeled for further discussion in FIG. 7.

In this example embodiment, the first set of RSS signals 402 are directly received by the first near-field device 302 from the TSS signals transmitted by the second near-field device 306. Similarly, the second set of RSS signals 404 are directly received by the second near-field device 306 from the TSS signals transmitted by the first near-field device 302.

In various example embodiments, the first and second sets of RSS signals 402, 404 can be encoded and relayed to either of the near-field devices 302, 306 so that each of the near-field devices 302, 306 can have both sets of RSS signals 402, 404 for perhaps noise cancelation, error monitoring, canceling out various undesirable user movements, selecting one of the RSS signals over another due to interference present at one of the two devices 302, 306, and so on so as to obtain a crisp and robust RSS signal set.

In some example embodiments, near-field devices 302, 306 are characterized/initialized so that any hardware and/or manufacturing difference between the near-field devices 302, 306 can be normalized and removed from the sets of RSS signals 402, 404.

The RSS signals 402, 404 drop from a high signal-strength to a low signal-strength during the first surface's 304 (e.g. finger) approaching (phase 1) 310 toward the third surface 316 (i.e. the distance 318 decreases). The RSS signals 402, 404 then incrementally vary during the swiping (phase 2) 312 either as the first surface 304 (e.g. finger) incrementally moves, or due to surface variation in the third surface 316. The RSS signals 402, 404 rise from the low signal-strength to the high signal-strength during the first surface's 304 (e.g. finger) retreating (phase 3) 314 from the third surface 316 (i.e. the distance 318 increases). This sequence of movements (i.e. approach, swipe, retreat) is repeated 6 times (see waveforms).

Noise on the first set of RSS signals 402 is due to interference signals coupled to the first surface 304 (e.g. user's hand/finger). The second surface 308 (e.g. user's body) is further away and thus there is less noise on the second set of RSS signals 404.

More specific to this particular example 400, the x-axis is time in seconds and the primary and secondary y-axis are the RSS signals 402, 404 measured in dBuV. A sequence of 30 seconds is composed of distinct RSS signals 402, 404 decreases, each approximately 0.9 seconds wide and mapping to the movement described by FIG. 3. In Phase 1 406, when approaching the surface, the RSS signals 402, 404 are decreasing from 62 dBuV to a constant 58 dBuV. In phase 2 408 during the short swipe along the third surface 316. In phase 3 410 when moving away from the surface the RSS signals 402, 404 increase to the initial value of 62 dBuV.

Figure 5:
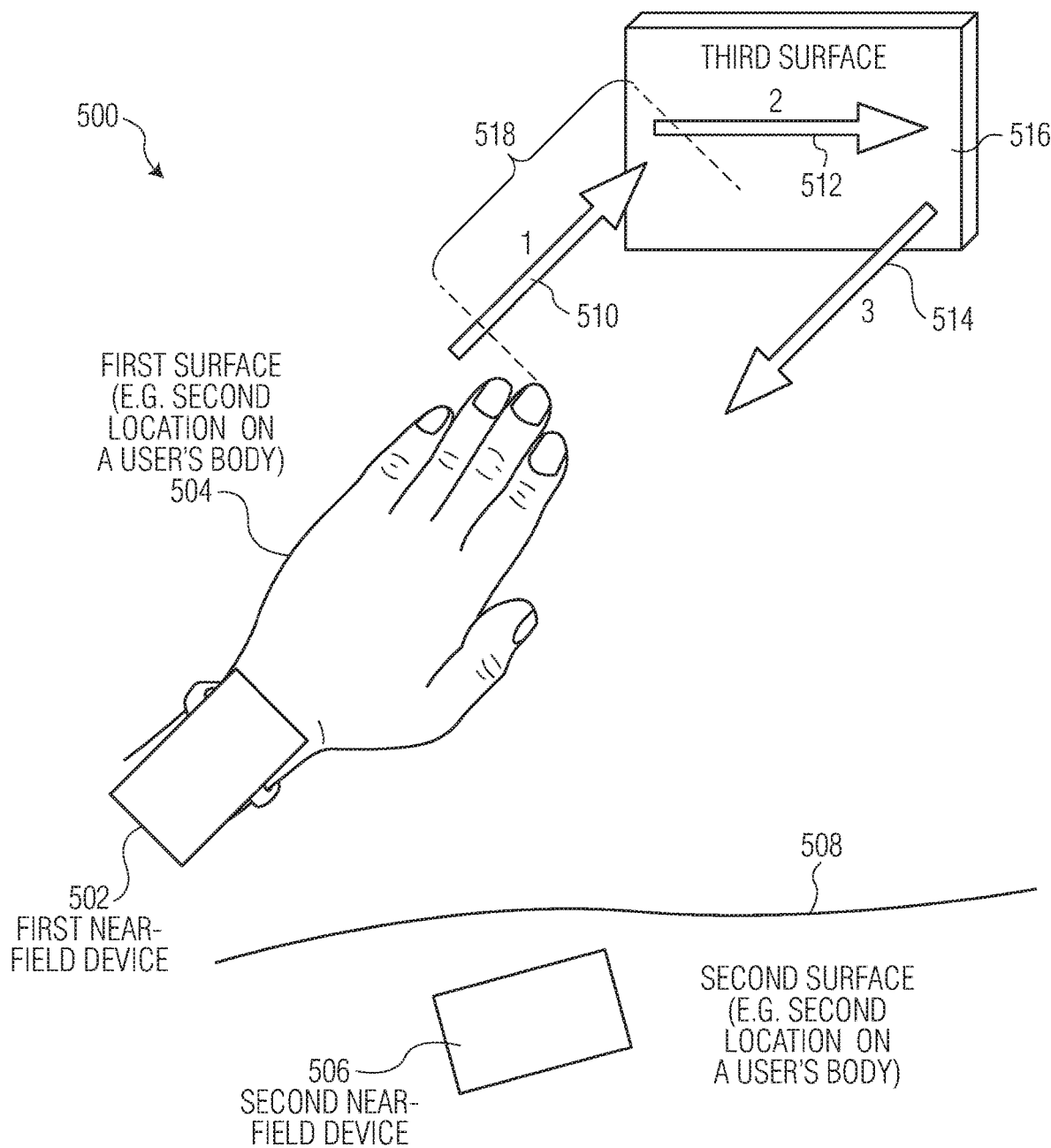
FIG. 5 is a second example of the first near-field device on the first surface and the second near-field device on the second surface moving with respect to the third surface.

FIG. 5 is a second example of the first near-field device 502 on the first surface 504 (e.g. a user's hand) and the second near-field device 506 on the second surface 508 moving with respect to the third surface 516. In the example 500 movements are shown as an approaching (phase 1) 510 out of plane to the third surface 516, a swiping (phase 2) 512 substantially parallel to the third surface 516 plane, and a retreating (phase 3) 514 also out of plane to the third surface 516. At any moment in time a distance 518 of the first surface 504 (e.g. a user's finger) to the third surface 516 is shown.

In various example embodiments the first and second surface 504, 508 are two different locations on a single surface. The single surface can be a user's body, and the first surface 504 is proximate to the user's hand and/or finger; while the second surface 508 is proximate to the user's torso.

Thus for example, the first near-field device 502 can be an NFEMI device attached to a user's left wrist (e.g. perhaps in a smartwatch) and the second near-field device 506 can also be an NFEMI device but is instead attached to another position on the user's body that is not too close to the first NFEMI device.

Figure 6:
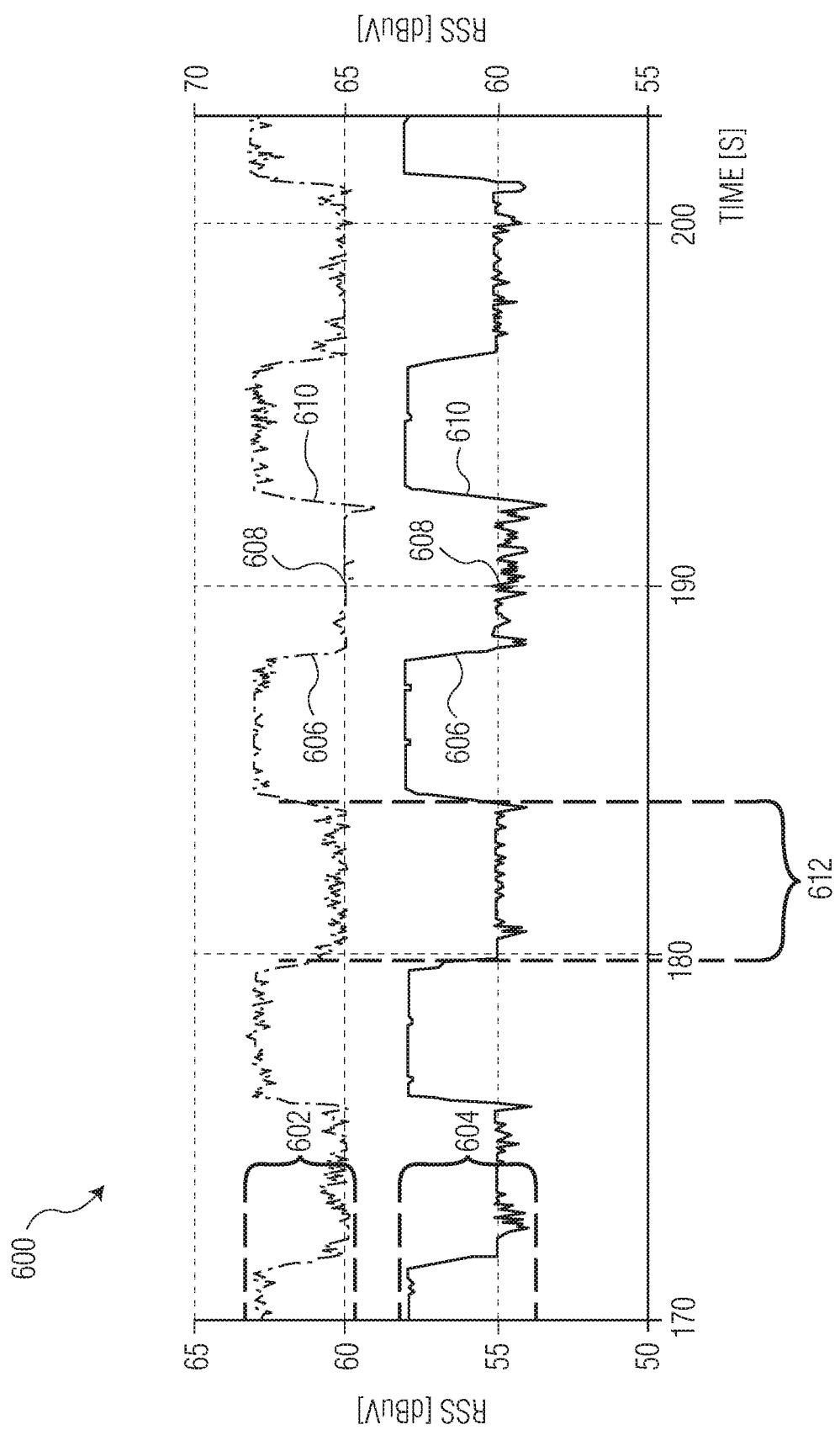
FIG. 6 is an example first set of received signal strength (RSS) signals and a second set of received signal strength (RSS) signals for the second example of FIG. 5.

In this example 500 a user's left hand is approaching a conductive surface (e.g. the third surface 516), then swiping very close to the conductive surface 516 from left to right before finally moving away from the conductive surface 516. This sequence of movements is repeated for 4 times, an example of which is shown in FIG. 6. In some example embodiments, the second near-field device 506 is kept relatively motionless such that the RSS signal is affected only by the distance 518 of the first surface 504 from the third surface 516.

FIG. 6 is an example 600 first set of received signal strength (RSS) signals 602 and a second set of received signal strength (RSS) signals 604 for the second example 500 of FIG. 5. In this example 600 an approaching (phase 1) 606, a swiping (phase 2) 608, and a retreating (phase 3) 610 are shown in the RSS signal 602, 604 waveforms. A subset 612 (i.e. of one of the swipes (phase 2) 608) is labeled for further discussion in FIG. 7.

In this example embodiment, the first set of RSS signals 602 are again directly received by the first near-field device 502 from the TSS signals transmitted by the second near-field device 506. Similarly, the second set of RSS signals 604 are again directly received by the second near-field device 506 from the TSS signals transmitted by the first near-field device 502.

More specific to this particular example 600, the x-axis is time in seconds and the primary and secondary y-axis are the RSS signals 602, 604 measured in dBuV at the first near-field device 502 and the second near-field device 506 respectively. A sequence of 30 seconds is composed of distinct RSS signals 602, 604 decreases, each approximately 3.3 seconds wide and mapping to the movement described by FIG. 5. In Phase 1 606, when approaching the third surface 516, the RSS signals 602, 604 are decreasing from 63 dBuV to a constant 55 dBuV. In phase 2 608 when the hand is close to the conductive surface 516. In phase 3 610 when moving away from the third surface 516 the RSS signals 602, 604 increase to the initial value of 63 dBuV. These RSS signals 602, 604 sequences are recorded 4 times.

While in the examples 300, 500 above the two near-field devices are on-body, in alternate embodiments one near-field device and be on-body and the other near-field device off-body (e.g. as in some example internet of things (IOT) applications).

Figure 7:
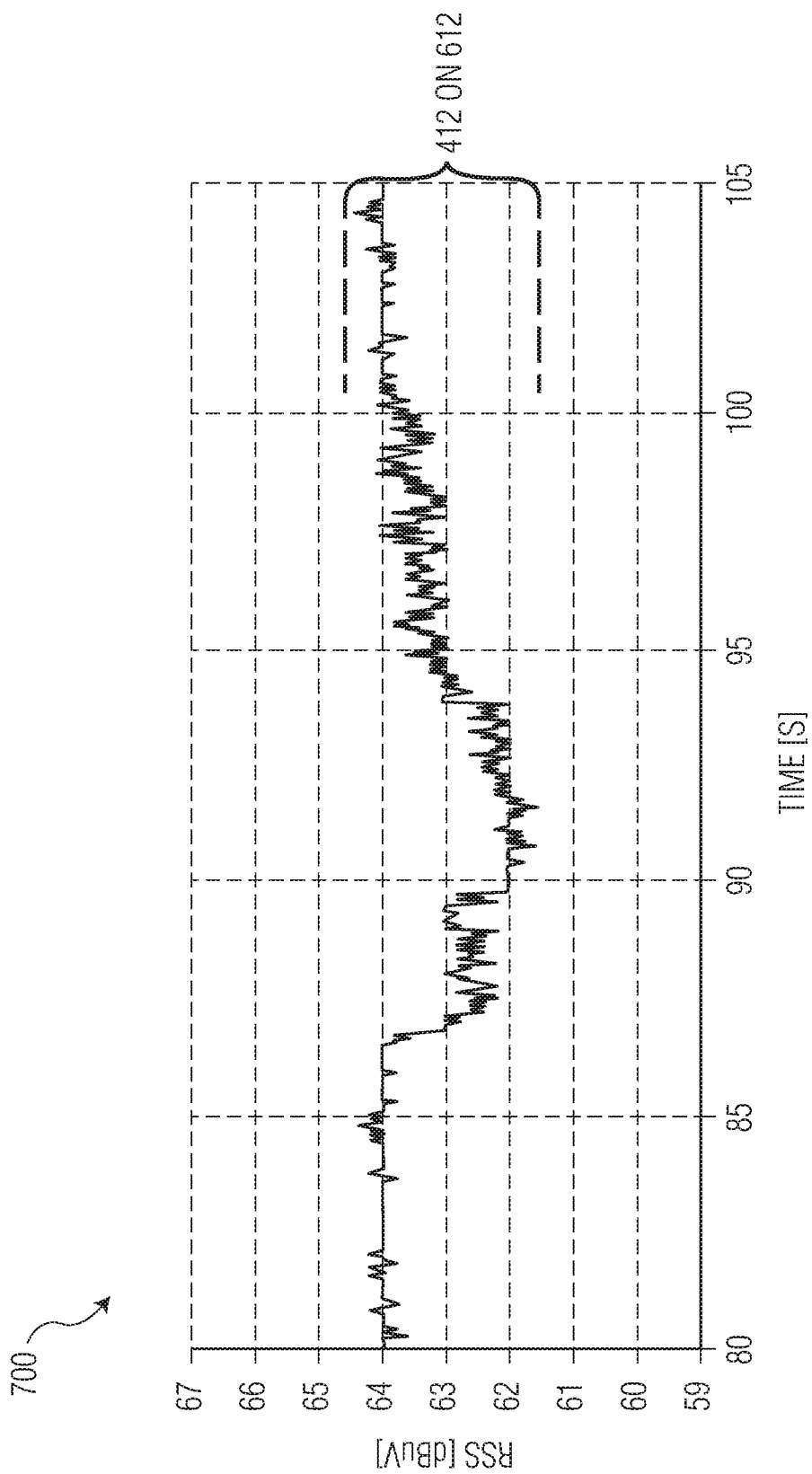
FIG. 7 is an example third set of received signal strength (RSS) signals for either first example of FIG. 3 or the second example of FIG. 5 as the first surface is swiped across the third surface.

FIG. 7 is an example third set of received signal strength (RSS) signals (i.e. subset 412 (e.g. swiping (phase 2)) or subset 612 (e.g. swiping (phase 2))) for either first example of FIG. 3 or the second example of FIG. 5 as the first surface 304 or 504 is swiped across the third surface 316 or 516.

Thus distinct patterns in RSS signal changes can be detected and recorded just during the phase 2 horizontal swiping movements. In some example embodiments these RSS signal variations are due to mainly first surface incremental movements with respect to the third surface. While in other embodiments these RSS signal variations are due to imperfections in the third surface itself.

More specific to this particular example 700, the measured RSS signal 412, 612 abruptly drops from about 64 dBuV to 62 dBuV at a start (e.g. at 87 seconds) of a swipe as a user's index finger FIG. 3 (or hand see FIG. 5) first reaches the conductive structure. During the swipe, the user's index finger gradually (see slope) moves further away from the conductive structure at the end (e.g. at about 100 seconds) of the swipe, yielding perhaps a user specific swiping pattern.

Thus, for specific gestures (e.g. a user's physical swiping of a finger or hand on a touch screen) these RSS changes can be recorded as unique RSS patterns over time and used for user recognition. This user specific data can be used to decide whether an attempted activation of the device belonging to the conductive surface 316, 516 is allowed or not. Another application can be determining whether a set of a user's physical movements (e.g. an operation) consisting of one or multiple specific hand (or other body parts) movements was performed in the correct manner as is required when handling, assembling, and/or performing quality assurance on a set of goods or products.

In another example embodiment, the measured RSS, similar to those shown in FIG. 7 can be due only to surface height variations in the conductive structure. Thus particular conductive structures can be identified just by swiping. Once a particular conductive structure is identified, such identification can trigger other actions such as an information display and/or activation of a computer program on a user's smart-device (e.g. as a tag to activate some other software/hardware, playback of a message, display a video, etc.), and/or transmission of a communications signal indicating that the user has reached a particular physical location (e.g. "at a correct location" or "opening the right door") to which the conductive surface 316, 516 is attached.

In other example embodiments, this RSS variation during swiping can be part of security authentication (e.g. a particular finger next to a particular surface). To aid such above embodiments, the conductive structure can be designed to have a significant surface roughness or step variations to ensure clearly identifiable and crisp RSS signal variations.

Monitoring the RSS signal variations allows more sensitive proximity detection or movement and gesture discrimination. A conductive structure will have a specific and repeatable effect on the received signals strength measured. Such specific and repeatable effects can be stored in memory and mapped to for example a varying physical position relative to a conductive structure (e.g. monitoring a user's exercise in a gym). Another use case can be granting access to a user at an access control conductive structure incorporated in a doorway based on a set of expected RSS signal changes. When dedicated manufacturing or assembly operations need to be performed that require that one conductive structure is touched, approached or manipulated in a specific arrangement with respect to other conductive structures. The RSS signals can be monitored to verify if such assembly use case, consisting of for example one or multiple specific hand movements, was performed in the correct manner as required when handling goods or assembling products. Thus by monitoring the RSS signals, a machine operator's safety can be better assured by creating an audible alarm if an operator gets too close to a machine/device that might harm the operator (e.g. when an operator's fingers are within 1 cm of a dangerous machine an audio signal in the operator's headphones warns the operator to stay away.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless device, comprising:
a first near-field device, including a near-field receiver, configured to be coupled to a first surface;
    wherein the first near-field device is configured to receive a received near-field signal having a received signal strength (RSS);
wherein the received near-field signal originates from a second near-field device having a near-field transmitter and configured to be coupled to a second surface;
    wherein the second near-field device is configured to generate a transmitted near-field signal having a transmitted signal strength (TSS);
wherein the TSS of the transmitted near-field signal interacts with a third surface to transform into the RSS of the received near-field signal; and
wherein the first near-field device is configured to translate a magnitude of the RSS to a distance of the first and/or second surfaces from the third surface.

2. The device of claim 1:
wherein the RSS signal is a non-propagating quasi-static electric near-field signal; and
wherein the third surface includes a conductive surface configured to conduct the non-propagating quasi-static electric near-field signal.

3. The device of claim 1:
wherein the RSS signal is a non-propagating quasi-static magnetic near-field signal; and
wherein the third surface includes a coil configured to conduct the non-propagating quasi-static magnetic near-field signal.

4. The device of claim 1:
wherein the RSS signal magnitude decreases when the distance between the first or second surfaces and the third surface decreases.

5. The device of claim 1:
wherein the RSS signal magnitude increases when the distance between the first or second surfaces and the third surface increases.

6. The device of claim 1:
wherein the first and second surface are two different locations on a single surface.

7. The device of claim 6:
wherein the single surface is a user's body.

8. The device of claim 7:
wherein the first surface is proximate to the user's hand and/or finger; and
wherein the second surface is proximate to the user's torso.

9. The device of claim 1:
wherein the third surface includes surface variations; and
wherein variations of the RSS signal magnitude when the first or second surfaces is proximate to and/or touches the third surface at a set of locations correspond to the surface variations of the third surface.

10. The device of claim 9:
wherein a coded pattern of surface variations is added to the third surface.

11. The device of claim 10:
wherein the RSS signal magnitude includes the coded pattern in response to the first or second surfaces proximity to and/or touching of the third surface at each of the set of locations.

12. The device of claim 10:
wherein the RSS signal magnitude includes the coded pattern in response to the first or second surfaces swiping across the third surface over the set of locations.

13. The device of claim 1:
wherein the first near-field device includes a controller;
wherein the controller is configured to record a set of distances within a time period; and
wherein the controller is configured to output an authentication signal if the set of distances corresponds to a stored set of distances.

14. The device of claim 13:
wherein the authentication signal at least one of: activates an electronic device, permits entry to a secure space, indicates that a procedure has been correctly followed, and/or indicates that a quality assurance procedure has been performed.

15. The device of claim 1:
wherein the first near-field device includes a controller; and
wherein the controller is configured to monitor the distance.

16. The device of claim 15:
wherein the controller is configured to output an boundary breached signal if the distance is less than a predetermined distance.

17. The device of claim 15:
wherein the controller is configured to generate an acoustic signal having an amplitude and/or frequency modulated by the distance.

18. The device of claim 15:
wherein the controller is configured to generate a visual cue modulated by the distance.

19. The device of claim 1:
wherein the received near-field signal is a first received near-field signal;
wherein the RSS is a first RSS;
wherein the transmitted near-field signal is a first transmitted near-field signal;
wherein the TSS is a first TSS;
wherein the first near-field device includes a near-field transmitter;
    wherein the first near-field device is configured to generate a second transmitted near-field signal having a second TSS;
wherein the second near-field device includes a near-field receiver;
    wherein the second near-field device is configured to receive a second received near-field signal having a second RSS;
wherein the second TSS of the second transmitted near-field signal interacts with the third surface to transform into the second RSS of the second received near-field signal;
wherein the second near-field device is configured to transmit the second received near-field signal to the first near-field device; and
wherein the first near-field device is configured to generate an error signal if the second RSS and the first RSS differ by more than a predetermined RSS magnitude over a predetermined time period.

* * * * *